(12) United States Patent
Sigmund

(10) Patent No.: US 8,899,643 B2
(45) Date of Patent: Dec. 2, 2014

(54) PET WASTE COLLECTION DEVICE

(75) Inventor: Roy Paul Sigmund, Vancouver (CA)

(73) Assignee: Chuhar Industries Ltd., Surrey (CA)

( * ) Notice: Subject to any disclaimer, the term of this patent is extended or adjusted under 35 U.S.C. 154(b) by 300 days.

(21) Appl. No.: 13/322,985

(22) PCT Filed: May 28, 2010

(86) PCT No.: PCT/CA2010/000786
§ 371 (c)(1),
(2), (4) Date: Dec. 21, 2011

(87) PCT Pub. No.: WO2010/135821
PCT Pub. Date: Dec. 2, 2010

(65) Prior Publication Data
US 2012/0098281 A1   Apr. 26, 2012

Related U.S. Application Data

(60) Provisional application No. 61/213,317, filed on May 29, 2009.

(51) Int. Cl.
*A01K 29/00* (2006.01)
*E01H 1/12* (2006.01)
*A01K 27/00* (2006.01)

(52) U.S. Cl.
CPC ............ *A01K 27/004* (2013.01); *E01H 1/1206* (2013.01); *A01K 27/008* (2013.01); *A01K 27/006* (2013.01); *E01H 2001/128* (2013.01)
USPC .............................................. 294/1.3; 294/55

(58) Field of Classification Search
USPC .................. 294/1.3–1.5, 55, 103.1, 137, 153; 119/161, 795, 796; D30/162
See application file for complete search history.

(56) References Cited

U.S. PATENT DOCUMENTS

| | | | |
|---|---|---|---|
| 4,273,370 A * | 6/1981 | Kjaer | 294/1.3 |
| 5,174,620 A | 12/1992 | Huegelmeyer et al. | |
| 5,540,469 A | 7/1996 | Albert | |
| D377,247 S * | 1/1997 | Albert | D30/162 |
| 5,669,645 A | 9/1997 | Chuang | |
| 6,059,332 A | 5/2000 | Beascoechea Inchaurraga | |
| 6,453,967 B1 | 9/2002 | DiFabio et al. | |
| 6,983,966 B2 | 1/2006 | Azrikam | |
| 7,077,172 B2 | 7/2006 | Perkitney | |
| 7,374,215 B2 | 5/2008 | Anderson | |

(Continued)

FOREIGN PATENT DOCUMENTS

| | | |
|---|---|---|
| CA | 2415298 A1 | 7/2004 |
| WO | 0005458 A1 | 2/2000 |

*Primary Examiner* — Paul T Chin
(74) *Attorney, Agent, or Firm* — Oyen Wiggs Green & Mutala LLP

(57) ABSTRACT

Apparatus are provided for collecting pet waste. In embodiments a grapple coupled to a housing is selectively operable between a closed position in which the grapple and housing substantially enclose a body compartment and an open position in which the grapple and housing define a mouth in communication with the body compartment. A handle is coupled to the housing, and a grapple control on the handle is configured to selectively operate the grapple between the open and closed positions. The grapple control may comprise a grip lever. A bag roll may be supported inside the body compartment by an axle mount. Bags may be unspooled from the bag roll and, without being torn from the bag roll, placed over a portion of the housing and the grapple to provide a sanitary barrier between the apparatus and pet waste.

34 Claims, 16 Drawing Sheets

(56) References Cited

U.S. PATENT DOCUMENTS

| | | |
|---|---|---|
| 7,410,197 B2 | 8/2008 | Edwards |
| 7,506,615 B1 | 3/2009 | Sansone et al. |
| 7,523,972 B1 | 4/2009 | Wawrzynowski |
| 7,628,431 B2 | 12/2009 | Evans et al. |
| D634,491 S * | 3/2011 | Sigmund ...................... D30/162 |
| 2004/0256869 A1 | 12/2004 | Avishay |
| 2006/0231043 A1 | 10/2006 | Galdo |
| 2007/0132252 A1 | 6/2007 | Cioloboc |
| 2008/0265592 A1 | 10/2008 | Askinasi |
| 2009/0261603 A1 | 10/2009 | Boghozian |
| 2009/0261604 A1 | 10/2009 | Rodriguez et al. |
| 2011/0193359 A1 * | 8/2011 | Howard ........................ 294/1.3 |

* cited by examiner

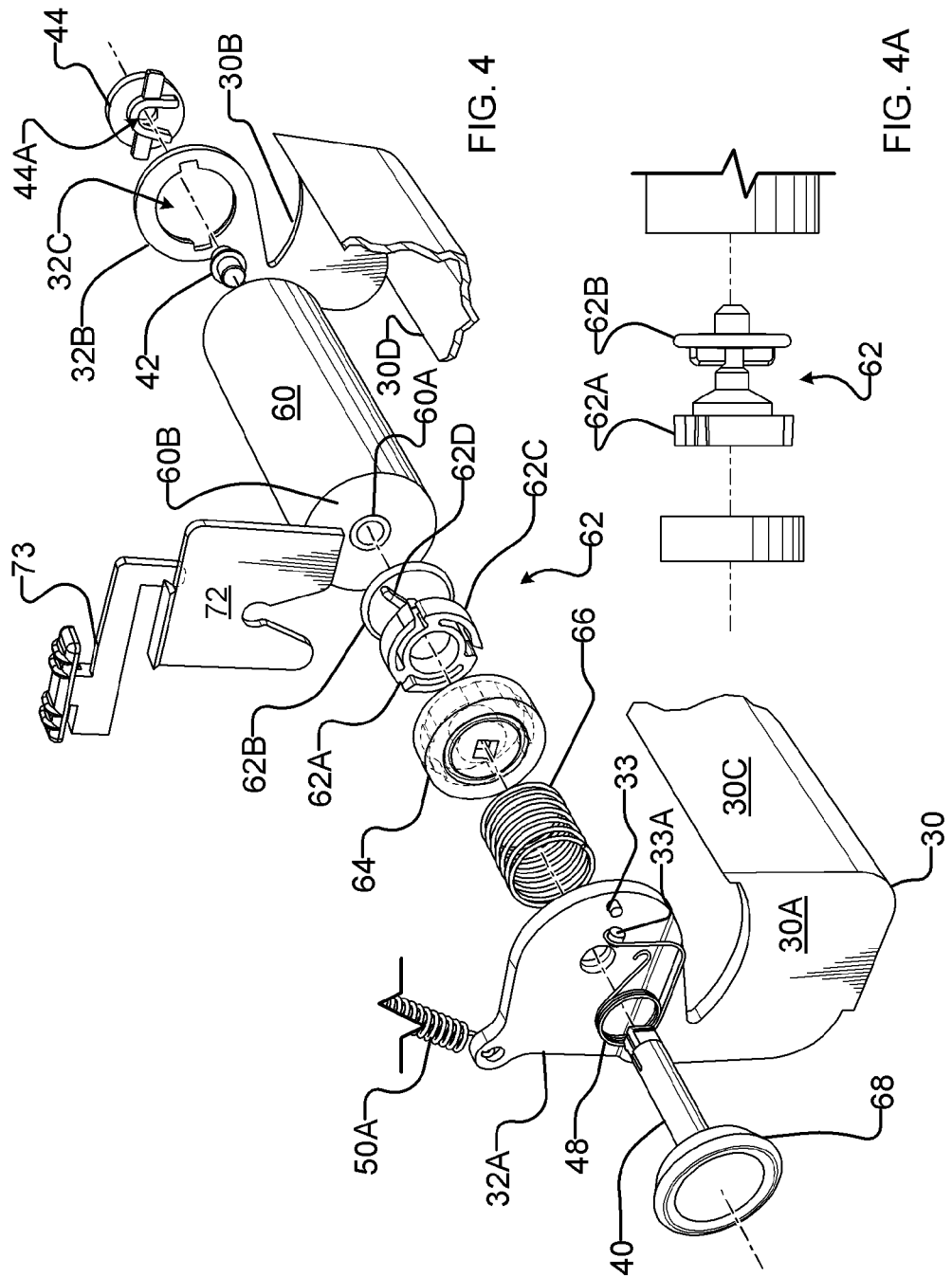

PET WASTE COLLECTION DEVICE

REFERENCE TO RELATED APPLICATION

This application claims the benefit of U.S. Provisional Application No. 61/213,317 filed 29 May 2009 and entitled SELF REELING DOG LEASH INCORPORATING PET WASTE BAGGING AND SEALING APPARATUS WITH LIGHTING SYSTEM, which is hereby incorporated herein by reference.

TECHNICAL FIELD

The invention relates to apparatus for collecting pet waste. Certain embodiments provide apparatus for collecting pet waste and simultaneously maintaining control over a pet using a leash.

BACKGROUND

Many pet owners are compelled by law and/or a sense of personal responsibility to collect and dispose of waste deposited in public spaces by their pets. Picking up pet waste is an noxious and onerous task. A common manual method for collected pet waste involves placing a hand inside a bag, using the bag-covered hand to manually grasp the waste, and rolling the bag off the hand to enclose the waste. This method optionally involves tying or otherwise closing the bag. Once used to enclose the waste, the bag must then be taken to an appropriate disposal site, which typically involves either conspicuously carrying the waste-containing bag, or placing it in a pocket or other vessel.

The disadvantages of manual waste collection are well understood. They include risk of accidental skin contact with waste, unpleasantness in having to touch waste (even though through a bag), social discomfort arising from carrying a waste containing bag in public, close personal proximity to the waste-containing bag between collection and disposal, and risk of waste leaking from the bag into a pocket or vessel in which the bag is stored.

Many pet owners are compelled by law and/or a sense of personal responsibility to maintain control of their pet in public spaces using leash. Picking up pet waste while controlling a pet on a leash may be difficult. For example, a pet owner may experience difficulty while maintaining leash control of her pet placing the bag over her free hand. Particularly difficulty may be experienced where one hand must be used to both hold the leash and perform the actions of rolling the bag off the hand and over the waste. Pets have been known to unexpectedly pull on leashes, and during the delicate task of collecting waste and unexpected pull could lead to undesired contact with pet waste.

The inventor has determined a need for pet waste collection apparatus that avoid one or more of the above disadvantages. Also, the inventor has determined a need for apparatus that facilitate simultaneous collection of pet waste and control of a pet on a leash.

There exist a number of patents and published patent applications relating to waste collection or leashes, including:

U.S. Pat. No. 7,523,972 to Wawrzynowski;
US Patent Application Publication no. 2009/021604 to Rodriguez et al.,
US Patent Application Publication no. 2008/0265592 to Askinasi;
US Patent Application Publication no. 2007/0132252 to Cioloboc;
U.S. Pat. No. 7,506,615 to Sansone et al.;
U.S. Pat. No. 7,410,197 to Edwards;
U.S. Pat. No. 7,374,215 to Anderson;
U.S. Pat. No. 5,174,620 to Huegelmeyer et al.;
US Patent Application Publication no. 2009/0261603 to Boghozian;
U.S. Pat. No. 6,059,332 to Beasoechea Inchaurraga;
Canadian Patent no. 2,4215,298 to Eaves;
PCT Patent Application Publication no. WO00/05458 to Grant;
US Patent Application Publication no. 2004/0256869 to Avishay;
U.S. Pat. No. 7,628,431 to Evans et al.;
U.S. Pat. No. 6,983,966 to Azrikam;
U.S. Pat. No. 5,540,469 to Albert;
US Patent Application Publication no. 2006/0231043 to Galdo.

The foregoing examples of related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with apparatus and methods which are meant to be exemplary and illustrative, not limiting in scope. In various embodiments, one or more of the above-described problems have been reduced or eliminated, while other embodiments are directed to other improvements.

An aspect of the invention provides a pet waste collection apparatus comprising a housing defining in part a body compartment, a handle coupled to the housing, a grapple coupled to the housing and selectively operable between a closed position in which the grapple and housing substantially enclose the body compartment and an open position in which the grapple and housing define a mouth in communication with the body compartment, a grapple control on the handle for selectively operating the grapple between the open and closed positions, and an axle mount configured to support a bag roll inside the body compartment.

Some embodiments comprise a grapple torsion spring configured to rotationally bias the grapple. In some embodiments, the grapple control comprises a catch configured to selectively latch the grapple against the rotational bias of the grapple torsion spring. In some embodiments, the grapple control comprises a grip lever selectively pivotable from an extended configuration to a retracted configuration by squeezing the grip lever toward the handle. In some embodiments, the grapple torsion spring is configured to rotationally bias the grapple to an open position and the grip lever is configured such that pivotal movement thereof from the extended configuration to the retracted configuration operates the grapple from the open position to the closed position.

Another aspect of the invention provides a bag roll mountable in a pet waste collection apparatus, the bag roll comprising an elongate member having first and second ends, a first axle mount engaging member coupled to the first end of the elongate member, a second axle mount engaging member coupled to the second end of the elongate member, and a web of interconnected plastic bags spooled around the elongate member. In some embodiments, the bag roll comprises the pawl member having at least one resilient pawl extending generally radially from and circumferentially around a central portion of the pawl member.

Yet another aspect of the invention provides a pet waste collection kit including a pet waste collection apparatus and a bag roll.

In addition to the exemplary aspects and embodiments described above, further aspects and embodiments, including but not limited to apparatus, methods and kits, will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 4 is an exploded view of an axle assembly of the apparatus depicted in FIG. 1.

FIG. 4A is an exploded view of a part of an axle assembly of the apparatus depicted in FIG. 1.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
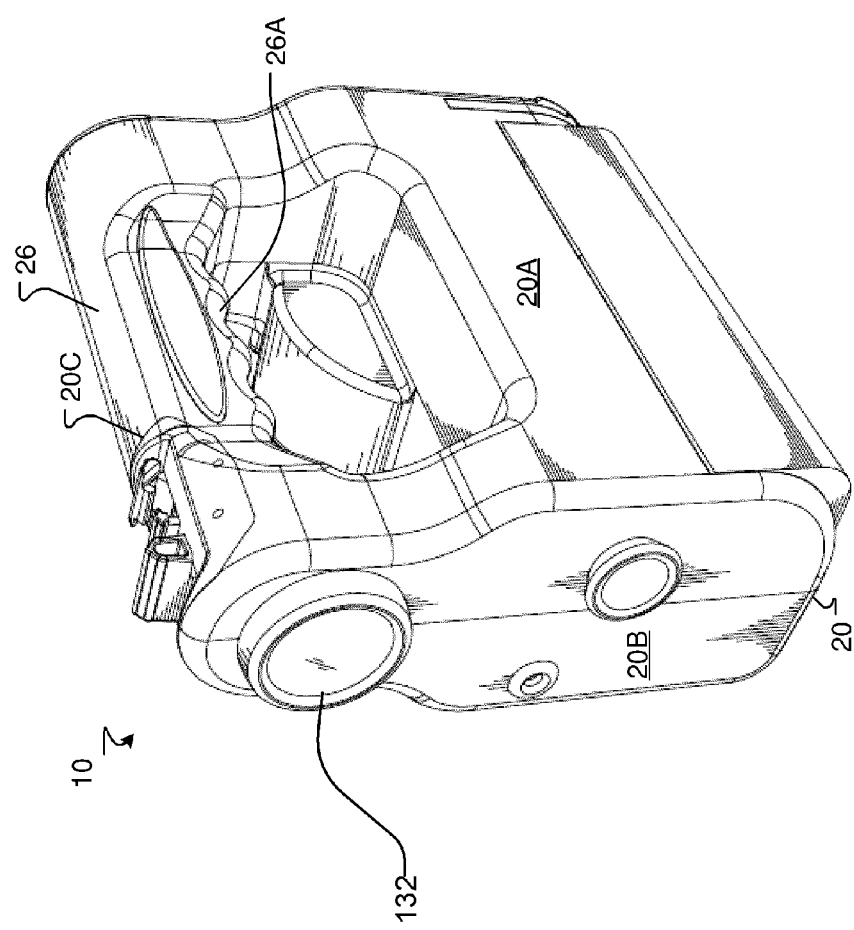
FIG. 1 is a perspective view of a pet waste collection apparatus according to an example embodiment.
Figure 2:
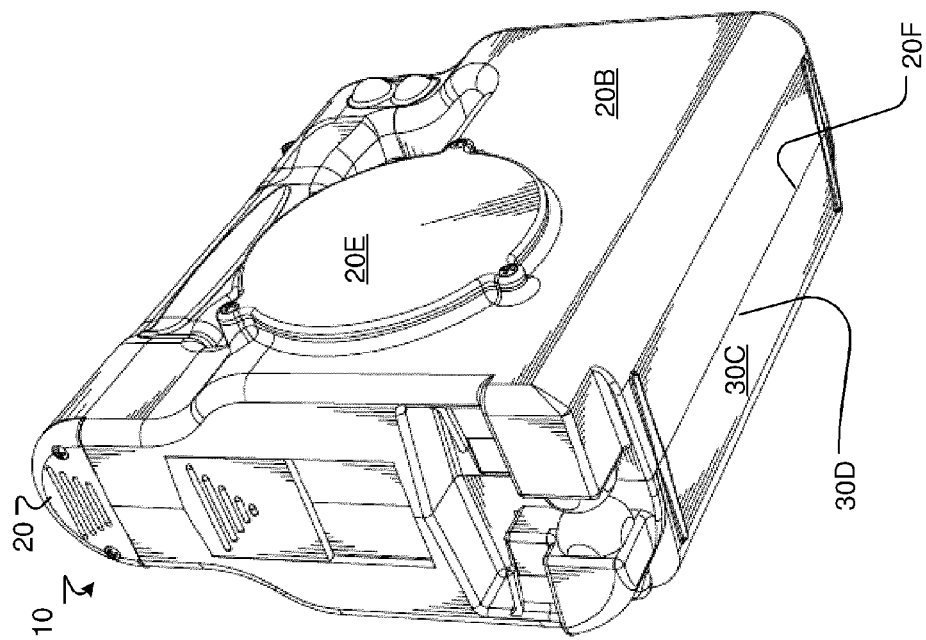
FIG. 2 is a perspective view of the apparatus depicted in FIG. 1.
Figure 3:
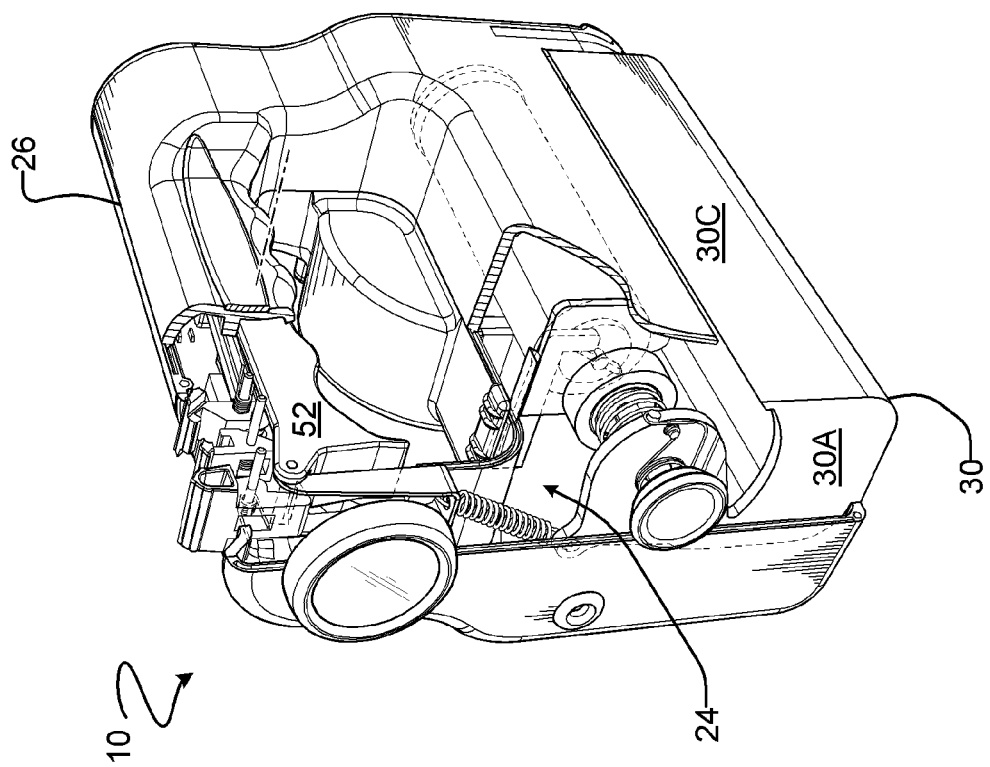
FIG. 3 is a partial cutaway perspective view of the apparatus depicted in FIG. 1.

FIGS. 1 and 2 are perspective views of a pet waste collection apparatus 10 according to an example embodiment. Apparatus 10 comprises a housing 20. Housing 20 comprises first and second shells 20A and 20B, an actuator panel 20C, a battery compartment panel 20D and a leash drum panel 20E. FIG. 3 is a partial cutaway perspective view of apparatus 10 in which a portion of first shell 20A of housing 20 is not shown in order to reveal internal components of apparatus 10.

Housing 20 may comprise hard plastic, metal, other suitable materials or a suitable combination thereof. Housing 20 may be manufactured by injection molding, stamping, and/or other means of industrial manufacture. Housing 20 may be entirely opaque or may contain one or more transparent or translucent portions.

Figure 4B:
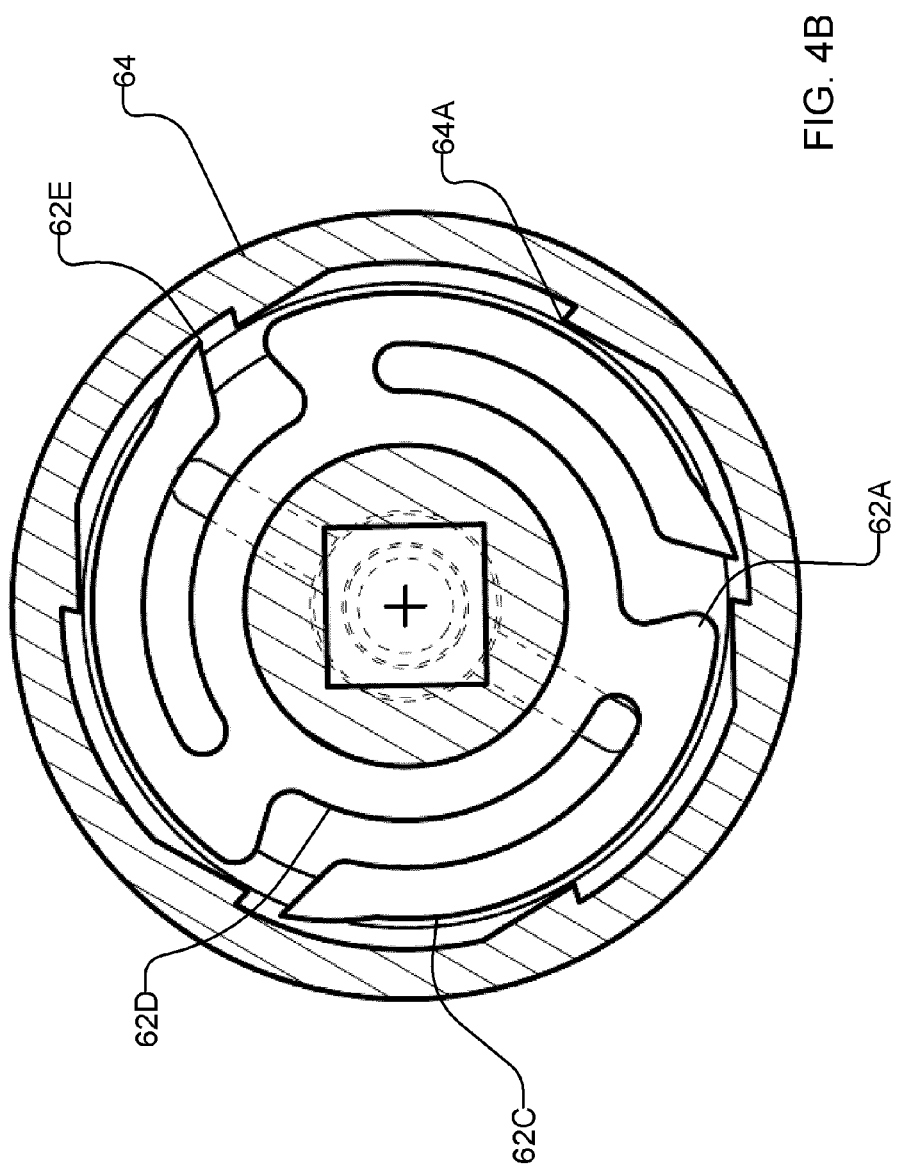
FIG. 4B is a cross-sectional view of a ratchet wheel in which is received a pawl member.

Apparatus 10 comprises a grapple 30 pivotally coupled to housing 20. In the illustrated example embodiment, grapple 30 is coupled to first shell 20A. As shown in FIGS. 3 and 4, grapple 30 comprises first side 30A, second side 30B and L-shaped section 30C. Grapple 30 is movable between a closed position, as shown in FIGS. 1-3, 5, 8-9 and 11, and an open position, as shown in FIGS. 6-7, 10 and 12. When grapple 30 is in the closed position lip 30D of L-shaped section 30C abuts edge 20F of second shell 20B, and the faces of L-shaped section 30C are substantially parallel to corresponding faces of second shell 20B. In the closed position, grapple 30 and housing 20 define a substantially enclosed body compartment 24. As described in further detail below, body compartment 24 provides a space for discreet and sanitary storage of pet waste. In the open position, lip 30D is spaced apart from edge 20F of second shell 20B, and grapple 30 and housing 20 define a mouth M through which the interior of housing 20 is accessible.

Figures 5, 5A:
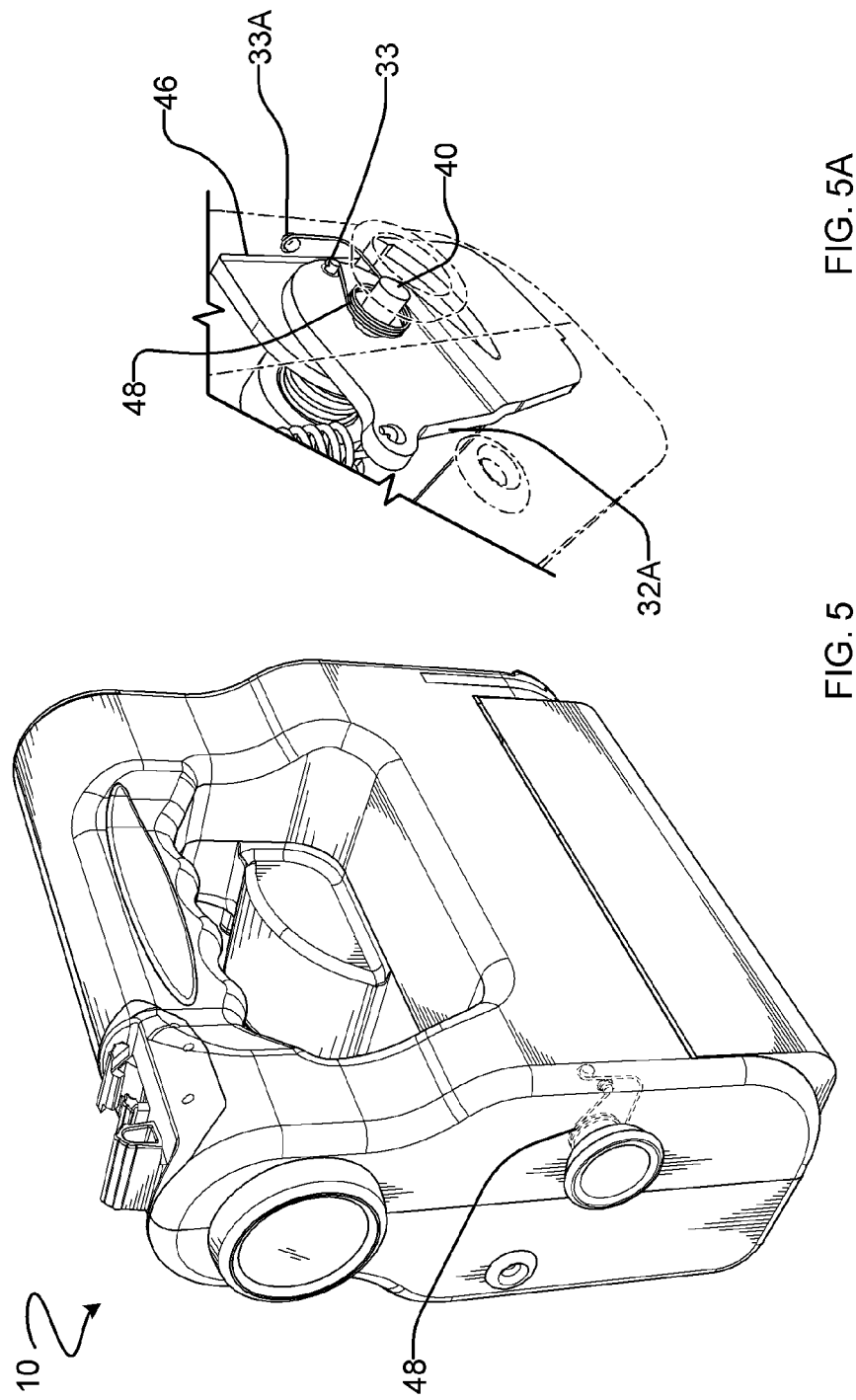
FIG. 5 is a perspective view of the apparatus shown in FIG. 1.
FIG. 5A is a partial perspective view of a grapple bias mechanism of the apparatus shown in FIG. 1.

As shown in FIG. 4, first side 30A of grapple 30 comprises a first arm 32A. As shown in FIG. 5A, first arm 32A of grapple 30 is mounted between the inward side of the front face of housing 20 and a support plate 46 that extends transversely inwardly from first shell 20A. First arm 32A is mounted for rotation about a retention pin 40. Retention pin 40 is journaled in a hole (not shown) in the front face of first shell 20A, and also journaled in a hole (not shown) defined in support plate 46. Second side 30B comprises a second arm 32B. Second arm 32B of grapple 30 is mounted adjacent the inward side of the rear face of housing 20 for rotation about a collar 44. In particular, a hole 32C defined in second arm 32B journals collar 44, which is fixed on the interior surface of the rear face of housing 20. In some embodiments, collar 44 is integrally formed with housing 20. Retention pin 40 and collar 44 are co-axial. Grapple 30 is thus rotatable about the common axis of retention pin 40 and collar 44 between the closed position and the open position.

Apparatus 10 comprises a handle 26 coupled to housing 20. In the illustrated embodiment, handle 26 is integrally formed with housing 20. In other embodiments, handle 26 comprises a separate component connected to housing 20. In some embodiments, such as the illustrated embodiment, handle 26 and mouth M defined by grapple lip 30D and housing edge 20F are on substantially opposite sides of body compartment 24. In some embodiments, handle 26 and mouth M are on substantially adjacent sides of body compartment 24. In some such embodiments, handle 26 extends along adjacent sides of body compartment 24.

In some embodiments, such as the illustrated embodiment, the axis of handle 26 is substantially parallel to the axis about which grapple 30 rotates to open and close mouth M. In other embodiments, the axis of handle 26 is substantially transverse to the axis about which grapple 30 rotates to open and close mouth M. In some embodiments, the axis of handle 26 is inclined with respect to the axis about which grapple 30 rotates (e.g., the axis of handle 26 and the axis about which grapple 30 rotates may lie in planes that are not parallel).

It will be appreciated that housing 20, handle 26 and grapple 30 may have different shapes than those shown in the figures. For example, handle 26 may be curved.

In the illustrated embodiment, handle 26 is amenable to grasping using an overhand grip (also known as a power grip). Where a user holds handle 26 with an overhand grip, the palm of his hand will face the same general direction as mouth M. Advantageously, this configuration provides for ergonomic control of the location and orientation of mouth M. In particular, this embodiment provides a standing or crouching user the ability to precisely control mouth M to cover pet waste located on a ground surface. In use, the user's forearm may be generally vertically inclined with respect to the ground surface. In some situations, this may reduce the distance that the user must bend down in order to collect pet waste.

The opposition of handle 26 and mouth M with respect to body compartment 24 may also provide further advantages in the control of the location and orientation of mouth M. For example, with an overhand grip of handle 26 the user can precisely control the locations of lip 30D and edge 20F by articulating his wrist about its dorsopalmar axis for palmar flexion (tilting towards the palm) and dorsiflexion (tilting towards the back of the hand), by articulating his wrist about its transverse axis for radial deviation (abduction, movement towards the thumb) and ulnar deviation (adduction, movement towards the little finger) and by rotating his hand and forearm for supination and pronation.

In the illustrated embodiment, handle 26 comprises an ergonomic grip surface, namely scalloped face 26A. In the illustrated embodiment, handle 26 is closed at its opposite ends. Advantageously, a closed-ended handle may guard against inadvertent loss of control of apparatus 10, such as may be caused by the handle slipping along a user's grip. In some embodiments, handle 26 is open at one of its ends. Where handle 26 comprises an open end, the open end may comprise a pommel.

Apparatus 10 comprises a control on handle 26 operable to cause grapple 30 to rotate between open and closed positions. In the illustrated embodiment, the control comprises a grip lever 52 and a catch 54. Grip lever 52 and catch 54 are located at the same end of handle 26 in actuator panel 20C. It will be appreciated that the co-location of grip lever 52 and catch 54 at the same end of handle 26 enables a user holding apparatus 10 by an appropriate overhand grip of handle 26 to operate both grip lever 52 and catch 54 using the digits of that hand without adjusting his grip of handle 26.

In the illustrated embodiment, grip lever 52 is pivotally mounted in handle 26 for movement between a retracted configuration (as shown in FIGS. 3 and 13-15) and an extended configuration (as shown, in FIGS. 6-7, 10 and 12). In the illustrated embodiment, grip lever 52 pivots in a plane that substantially contains the axis of handle 26 (i.e., the axis about which grip lever 52 pivots is transverse to the axis of handle 26). A recess defined in the underside of handle 26 permits grip lever 52 to be displaced into handle 26, such as by manual squeezing action.

In the illustrated embodiment, grip lever 52 comprises a scalloped face 52A generally opposite handle 26. Scalloped face 52A provides an ergonomic surface against which a user holding apparatus 20 by handle 26 with an overhand grip can apply squeezing force using his fingers to move grip lever from the extended configuration to the retracted configuration. In the illustrated embodiment, the scallops of face 52A match the scallops of face 26A of handle 26 when grip lever is in the retracted configuration.

As shown in FIG. 5A, a torsion spring 48 connected between support plate 46 and first arm 32A biases grapple 30 for opening rotation. A first arm of torsion spring 48 is anchored to a peg 33 defined on arm 32A. A second arm of torsion spring 48 is anchored to a peg 33A connected to housing 20. Grip lever 52 is connected by a linkage 50 to first arm 32A of grapple 30. The force of torsion spring 48 on grapple 30 is transferred via linkage 50 to grip lever 52. Torsion spring 48 thus acts to bias grip lever 52 to the extended configuration. As a result, force sufficient to overcome the bias of torsion spring 48 must be applied to grip lever 52 in order to move grip lever 52 from the extended configuration to the retracted configuration. When grip lever 52 is in the retracted configuration, linkage 50 acts on first arm 32A to maintain grapple 30 in the closed position.

Notch end 54A of catch 54 is engageable with a bar 53 connected to grip lever 52 where it joins linkage 50. Engagement of notch end 54A of catch 54 with bar 53 holds grip lever 52 in the retracted configuration against the bias of torsion spring 48. Catch 54 is pivotally mounted in actuator panel 20C, which is located at the same end of handle 26 as grip lever 52. A torsion spring 54C biases catch 54 for rotation to engage bar 53 when grip level 52 is retracted (i.e. torsion spring 54C biases catch 54 to rotate in the direction shown by arrow 56A in FIG. 7). Catch 54 may be pivoted to release bar 53 by exerting force on free end 54B of catch 54 against the biasing force of the torsion spring (i.e., catch 54 will release bar 53 when pivoted in the direction shown by arrow 56B in FIG. 6). The underside of notch end 54A of catch 54 provides a ramp on which bar 53 may ride as it travels upward.

In operation, as grip lever 52 is squeezed toward the retracted configuration, linkage 50 pulls arm 32A to rotate grapple 30 against the bias force of torsion spring 48 to the closed position. As grip lever 52 approaches the retracted position, bar 53 slides along the underside of the notch end 54A of catch 54, causing catch 54 to rotate against the force of torsion spring 54C. When grip lever 52 attains the retracted configuration, bar 53 passes the end of the underside of notch end 54A, and catch 54 rotates under the force of torsion spring 54C to cause the notch end 54A of catch 54 to engage bar 53. The engagement of bar 53 with catch 54 maintains grip lever 52 in the retracted configuration after the squeeze pressure on grip lever 52 is released. When free end 54B of catch 54 is moved to rotate catch 54 against the force of torsion spring 56, bar 53 is released from notch end 54B of catch 54. Absent any opposing force, torsion spring 48 acts on arm 32A to rotate grapple 30, which moves linkage 50 to draw grip lever 52 to the extended configuration. It will be appreciated that the biasing forces exerted by torsion springs may be selected for easy manual operation of grip lever 52 and catch 54.

Other embodiments may have alternative grapple control configurations. For example, grapple 30 may be biased for rotation to the closed position, and a control may be configured to apply manual force to rotate grapple 30 for opening. In some embodiments, grapple 30 is not biased at all and a control is configured to apply manual force to rotate grapple for both opening and closing. In some embodiments, selectively engagable biasing elements are used to selectively bias grapple 30 for opening and closing rotation.

Linkage 50 comprises an optional extension spring 50A, which extends to relieve excess strain on linkage 50 which may be generated during use, such as, for example, when a user attempts to retract grip lever 52 while an incompressible object is trapped between lip 30D of grapple 30 and edge 20F of second shell 20B.

Apparatus 10 comprises a bag roll 60 mounted for rotation in body compartment 24. Bag roll 60 comprises bags which may be used to store pet waste. Advantageously, the location of bag roll 60 inside body compartment 24 protects bags on bag roll 60 from damage, such as punctures and tears. Apparatus 10 may be provided with or without bag roll 60.

As shown in FIG. 4, bag roll 60 of the illustrated embodiment comprises an elongate member, namely tube 60A, around which is spooled a web 60B of interconnected plastic bags. A pin 42 and a connector 62 comprise plugs which fit into the ends of tube 60A. Pin 42, tube 60A and connector 62 are permanently joined (e.g., as by adhesive bonding), such that pin 42, tube 60A and connector 62 turn together as an axle. The axle formed by pin 42, tube 60A and connector 62 is mounted in an axle mount provided in housing 20. The axle mount supports the axle formed by connector 62, tube 60A and pin 42 at both ends. Since tube 60A rotates as an axle, bag roll 60 comprises an axle and roll 60B rotates with the axle. Apparatus 10 may be provided with or without an axle.

In some embodiments, bag roll 60 is removable. Advantageously, a removable bag roll 60 may be removed when its supply of bags is exhausted, and replaced with another bag roll having a fresh supply of bags. In the illustrated embodiment, a first end of the axle mount comprises a fixed axle engaging member, namely collar 44, which defines aperture 44A, which is configured to receive an axle mount engaging member, namely pin 42. A second end of the axle mount comprises a resiliently biased an axle engaging member, namely a ratchet wheel 64. A compression spring 66 connected between ratchet wheel 64 and support plate 46 resiliently biases ratchet wheel 64 toward collar 44. Compression spring 66 is mounted about a retention pin 40 rigidly connected to ratchet wheel 64. Compression spring 66 normally biases ratchet wheel 64 to receive an axle mount engaging member, namely a pawl member 62A of connector 62. When ratchet wheel 64 is mated with pawl member 62A, compression spring 66 acts via connector 62 and tube 60A to maintain pin 42 in collar 44. It will be appreciated that in the illustrated embodiment, the axis defined by the axle mount (i.e., the axis about which bag roll 60 may rotate) is co-axial with the axis about which grapple 30 may rotate between open and closed positions.

Knob 68 is rigidly connected to retention pin 40, and, by extension, ratchet wheel 64. Retention pin 40 is dimensioned such that compression spring 66 acts to maintain knob 68 against the outer face of first shell 20A. The biasing force of compression spring 66 may be overcome by drawing knob 68 outwardly away from the front face of housing 20. When knob 68 is drawn outwardly ratchet wheel 64 is disengaged from pawl member 62A, the force of compression spring 66 on connector 62, tube 60A and pin 42 is relieved, and pin 42 may be withdrawn from collar 44 to remove bag roll 60 from body compartment 24. A guide recess 72A on a transverse support plate 72 connected to housing 20 receives the portion of connector 62 between pawl member 62A and disc 62B. Guide 72A may facilitate installation of bag roll 60.

Some embodiment comprise other configuration of axle mounts and/or bag rolls. In some embodiments, bag roll 60 is mounted to rotate around an axle mounted in housing 20. For example, tube 60A may be mounted to rotate on a shaft fixedly mounted in an axle mount provided in housing. In some embodiments, bag roll 60 comprises only a hollow rolled web 60B of interconnected plastic bags, which may be mounted to rotate on an axle. In some embodiments, bag roll 60 comprises a web 60B of interconnected plastic bags spooled on a solid shaft, the solid shaft forming all or part of an axle. In some embodiments, tube 60A is mounted to rotate about plugs in each of its ends. For example, tube 60A may journal the plugs of pin 42 and connector 62. It will be appreciated whenever bag roll 60 is supported on an axle mounted in an axle mount, bag roll 60 is also supported by the axle mount.

In some embodiments, an axle mount is configured to support only one end of an axle for bag roll 60. For example, an axle mount may comprise a threaded aperture formed in an end face of housing 20 and an axle may comprise a rod having a corresponding thread. In some embodiments, an axle mount provides for removal of an axle without use of spring biasing, such as, for example, by snap fit. For example, an axle mount may comprise co-axial dimples formed in opposed faces of housing 20, which dimples are configured for snap fit engagement with rounded ends of an axle rod.

Some embodiments comprise a mechanism for controlling the unspooling of bags from bag roll 60. In the illustrated embodiment, a rotating member rigidly coupled to bag roll 60 is subject to periodic frictional resistance with an inhibiting member rigidly connected to housing 20. As shown in FIG. 4, pawl member 62A comprises a central portion, namely ring 62D, and a plurality of arcuate pawls 62C. Pawls 62C extend generally radially outwardly from and circumferentially around ring 62D. The outward ends of pawls 62C (i.e., the ends not connected to the central portion of pawl member 62A) are normally spaced apart from the outer circumference of ring 62D. The outward ends of pawls 62C comprise flanges 62E. Flanges 62E have outward surfaces (surfaces adjacent and tangent to the radially outer surface of pawls 62C) and inward surfaces (surfaces adjacent and tangent to the radially inner surface of pawls 62C). Pawls 62C are flexible and resilient.

Pawls 62C are adapted to cooperate with corresponding radially inwardly projecting ratchet teeth 64A of a ratchet wheel 64. Rachet wheel 64 is selectively rigidly connectable to housing 20 by way of knob 68. A radially extending tab 82 formed on the face of knob 68 adjacent the outer front face of housing 20 is configured for locking engagement with a groove 80 formed on the outer front face of housing 20 that extends radially outwardly from hole 22A. When tab 82 sits in groove 80, rotation of knob 68 is inhibited. This rotational inhibition is transferred via retention pin 40 to ratchet wheel 64. It will be appreciated that compression spring 66, by urging knob 68 into contact with the outer surface of the front face of housing 20, will tend to cause tab 82 to sit in groove 80. The rigid connection of ratchet wheel 64 to housing 20 may be selectively eliminated by removing tab 82 from groove 80, such as by drawing knob 68 away from the outer front face of housing 20.

When pawl member 62A is rotated in ratchet wheel 64 in a first direction, pawls 62C of pawl member 62A pass teeth 64A of ratchet wheel 64. When flanges 62E of pawls 62C contact teeth 64A of ratchet wheel 64, the outward surfaces of flanges 62E ride on correspondingly sloped leading faces of teeth 64A and pawls 62C are deflected radially inwardly. When deflected, pawls 62C act as cantilever springs, increasing the friction between flanges 62E and ratchet teeth 64A, and providing resistance to rotation of pawl member 62A relative to ratchet wheel 64. Since pawl member 62A, being part of connector 62, is rigidly connected to bag roll 60, the resistance to rotation of pawl member 62A relative to ratchet wheel 64 controls the unspooling of bags from bag roll 60 when rigidly connected to housing 20.

After flanges 62E of pawls 62C pass the teeth 64A of ratchet wheel 64, pawls 62C return to their normal configuration. The passing of flanges 62E of pawls 62C by teeth 64A of ratchet wheel 64 may be accompanied by a noise (e.g., a "click" sound). Since pawl member 62A, being part of connector 62, is rigidly connected to bag roll 60, a user may use such a noise as an indication of the extent to which a bag has been unspooled from bag roll 60.

In their normal configuration, the inward surfaces of flanges 62E on pawls 62C will catch against the trailing faces of ratchet teeth 64A when pawl member 62A is counter-rotated (rotated opposite the first direction), thereby arresting counter-rotation of pawl member 62A in ratchet wheel 64.

Ratchet wheel 64 and pawl member 62A are configured so that counter-rotation (rotation opposite to the direction in which pawl member 62A rotates when bags are unspooled from bag roll 60A) of ratchet wheel 64 is transferred to pawl member 62A. As ratchet wheel 64 is counter-rotated, the ramp surface of teeth 64A frictionally engage outward surfaces of flanges 62E, such that pawl member 62A turns with ratchet wheel 64. The cooperative counter-rotation of pawl member 62A with ratchet wheel 64 may permit a user to re-spool bags on bag roll 60 by counter-rotating knob 68. In particular, knob 68 may be unlocked, by being drawn away from the outer face of housing 20, and counter-rotated while the engagement of pawl member 62A in ratchet wheel 64 is maintained. Pawl member 62A thus counter-rotated with ratchet wheel 64 causes bag roll 60 to re-spool the excess bags.

In the illustrated embodiment, pawl member 62A comprises three pawls 62C and ratchet wheel 64 comprises six teeth 64A. In some embodiments, the number of pawls 62C on pawl member 62A may be greater than the number of teeth 64A on ratchet wheel 64. In some embodiments pawl member 62A may have the same number of pawls 62C as ratchet wheel 64 has teeth 64A. Pawl member 62A may have as few as one pawl 62C. Ratchet wheel 64 may have as few as one tooth 64A.

It will be appreciated that in the illustrated embodiment, ratchet wheel 64 is both the axle engaging member and the inhibiting member rigidly connected to housing 20, and that pawl member 62A is both the axle mount engaging member coupled to the axle and the rotating member rigidly coupled to bag roll 60 that is subject to periodic frictional resistance with the inhibiting member.

Bag rolls configured for use with apparatus according to embodiments may be provided separately from the apparatus. For instance, a bag roll comprising connector 62, tube 60A and pin 42 may be provided to users wishing to recharge apparatus having a ratchet wheel 64 configured to mate with pawl member 62A of connector 62. In some embodiments, (e.g., loss of resilience in pawls of pawl member 62A) may be provided with the bag roll, such that the components are replaceable with the bag roll. In some embodiments, components subject to wear may be provided separately. In some embodiments, components subject to wear may be provided with a bag roll as a kit.

In some embodiments, connector 62 and ratchet wheel 64 comprise complementary gears rather than a pawl and ratchet arrangement, such that connector 62 and ratchet wheel 64 mate for rigid connection. In some such embodiments where pin 42, tube 60A and connector 62 are also rigidly connected, the rigid connection of connector 62 with ratchet wheel 64 causes retention pin 40 and bag roll 60 to be rigidly connected, such that retention pin 40 and bag roll 60 turn together.

In embodiments where bag roll 60 is rigidly connected to retention pin 40, tab 82 and groove 80 may be configured to provide a mechanism for controlling the unspooling of bags from bag roll 60. In particular, tab 82 and groove 80 may be configured to provide periodic frictional resistance to rotation of knob 68. For example, tab 82 may have a rounded profile such that the engagement of tab 82 with groove 80 is frictional rather than locking. Where tab 82 and groove 80 are configured to provide periodic frictional resistance to rotation of knob 68, tab 82 may act as a rotating member rigidly coupled to bag roll 60 that is subject to periodic frictional resistance with an inhibiting member rigidly connected to housing 20, namely groove 80. Frictional resistance between tab 82 and groove 80 may be overcome by applying sufficient torque to knob 68 to cause tab 82 to slip out of groove 80, such as by drawing a bag from bag roll 60, for example. It will be appreciated that the profiles and/or radial lengths of tab 82 and groove 80 may be configured to provided desired degrees of frictional resistance.

It will be appreciated that other configurations and/or mechanisms may be used for controlling the unspooling of bags from bag roll 60. In some embodiments, periodic frictional resistance is applied to other rotating members rigidly connected to bag roll 60, such as, for example, disc 70. In some embodiments, ratchet wheel 64 is provided on connector 62 and pawl member 62A is provided on retention pin 40. In some embodiments, periodic resistance is provided by differential friction, such as, for example, where a rotating member rigidly connected to bag roll 60 traverses surfaces having different coefficients of dynamic friction. In some embodiments, the rotation of bag roll 60 is periodically inhibited by the application of friction to bag roll 60 directly, rather than via connector 62. For example, bag roll 60 may not be rigidly connected for rotation with connector 62 (e.g., tube 60A may rotate freely with respect to pin 42 and connector 62), and a cam surface that rotates with bag roll 60 (e.g., an axial cam defined on the interior surface of tube 60A) may periodically develop friction against a resiliently compressible surface connected to housing 20.

In the illustrated embodiment connector 62 comprises a disc 62B located intermediate bag roll 60 and pawl member 62A. Disc 62B comprises a radial spline 62D. A tear lock 73 slidably mounted in the wall of housing 20 that defines a side of body compartment 24 is selectively engageable with spline 62D to lock rotation of connector 62, as shown in FIG. 3. In embodiments where connector 62 is rigidly connected to bag roll 60, a user may use tear lock 73 to lock bag roll 60 before attempting to tear a bag from web 60B. It will be appreciated that other tear lock configurations may be used. For example, a tear lock 73 may be mounted for selective engagement with any rotating element rigidly connected to or forming part of bag roll 60. Tear lock 73 may be mounted pivotally.

Web 60B of bag roll 60 comprises a continuous two-ply tubular plastic web subdivided into a series of interconnected bags. The plastic web may comprise degradable plastic, such as, for example high-density polyethylene (HDPE), low-density polyethylene (LDPE), or linear low-density polyethylene (LLDPE). It will be appreciated that bags of any suitable type could be provided on bag roll 60, such as, for example, gusseted bags or the like.

Each bag of web 60B is separated from its neighbours by perforations 61 for tearing-separation. Web 60B is spooled on bag roll 60 such that an open end (mouth) of the outermost bag on bag roll 60 is exposed. It will be appreciated that when grapple 30 is in the open position, bag roll 60 is accessible to a user, who may grasp the open end of the outermost bag and unspool it from roll 60. It will further be appreciated that since the axis of rotation of bag roll 60 is generally parallel to lip 20D and edge 20F, grapple 30 may be closed on a bag unspooled from bag roll 60 without undue bunching or twisting of the bag. In some embodiments, bag roll 60 is mounted transversely with respect to lip 20D and edge 20F.

Figure 12:
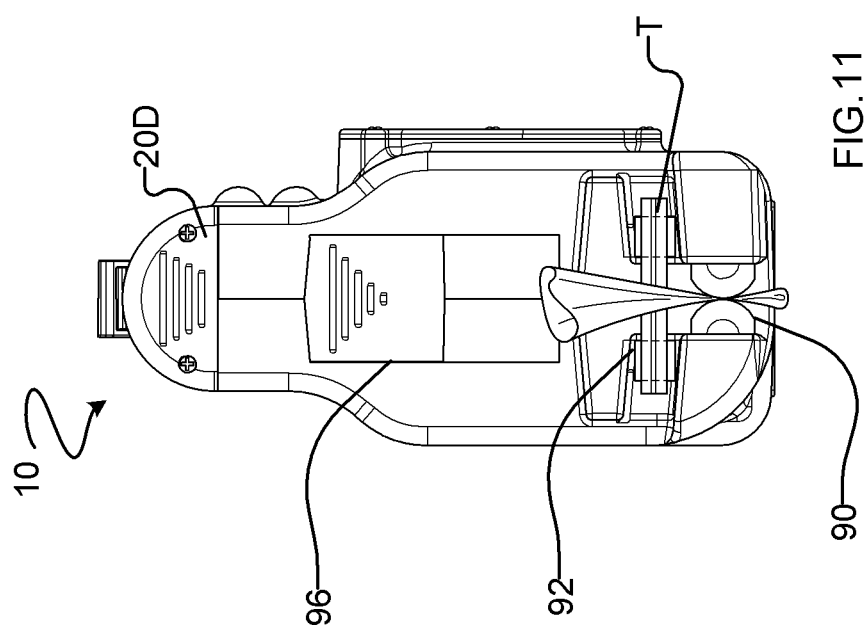
FIG. 12 is a side elevation view of the apparatus shown in FIG. 1.

In the illustrated embodiment, web 60B is folded twice along its length in a zig-zag fashion prior to being spooled, as shown in FIG. 12. The folding of web 60B effectively reduces the width of web 60B to approximately one third of its original width. This feature may enable bag roll 60 to be contained within housing 20, yet supply bags having mouths larger than exterior dimensions of housing 20. Because web 60B is zig-zag folded, a bag may be unspooled from bag roll 60, unfolded without being torn from bag roll 60, and expanded along the length of housing 20. It will be appreciated that other folding configurations may be used to provide a bag that may be unfolded to span the bottom of housing 20. For example, bag roll 60 could comprise a spooled web of interconnected bags folded three, four or more times along its length in a zig-zag fashion prior to being rolled.

In some embodiments, such as the embodiment depicted in FIG. 12, perforations 61 which subdivide web 60B into interconnected bags are oriented at an angle the lateral edges of web 60B. As a result, when web 60B is folded along its length, bag-defining perforations 61 are folded apart from one another in a zig-zag pattern rather than being folded on themselves. This may reduce the manual force required to tear bags from bag roll 60.

Figure 7:
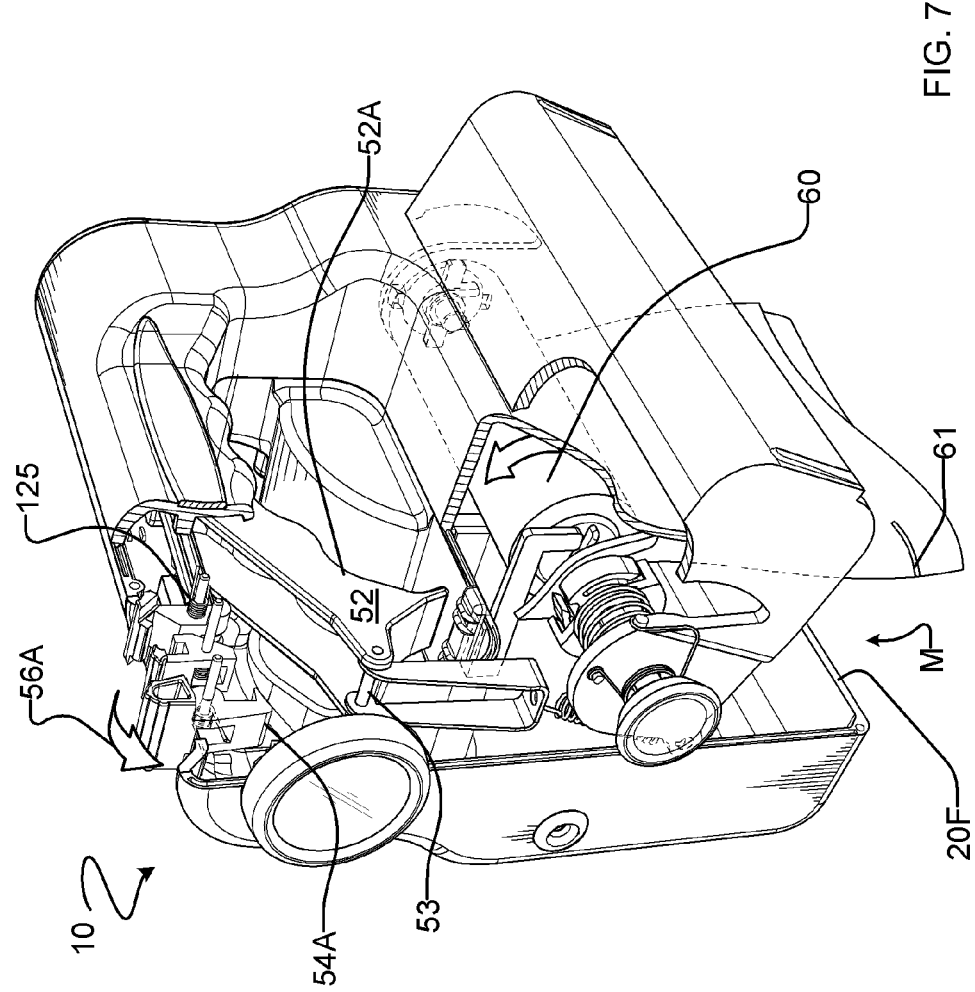
FIG. 7 is a partial cutaway perspective view of the apparatus shown in FIG. 1.
Figure 8:
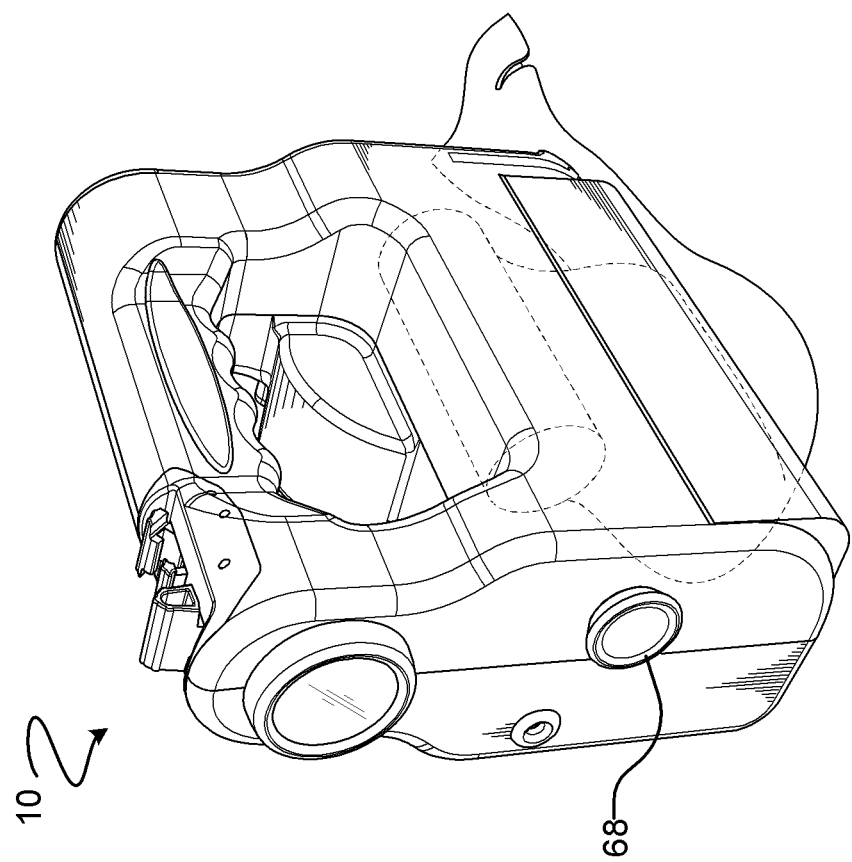
FIG. 8 is a perspective view of the apparatus shown in FIG. 1.
Figure 9:
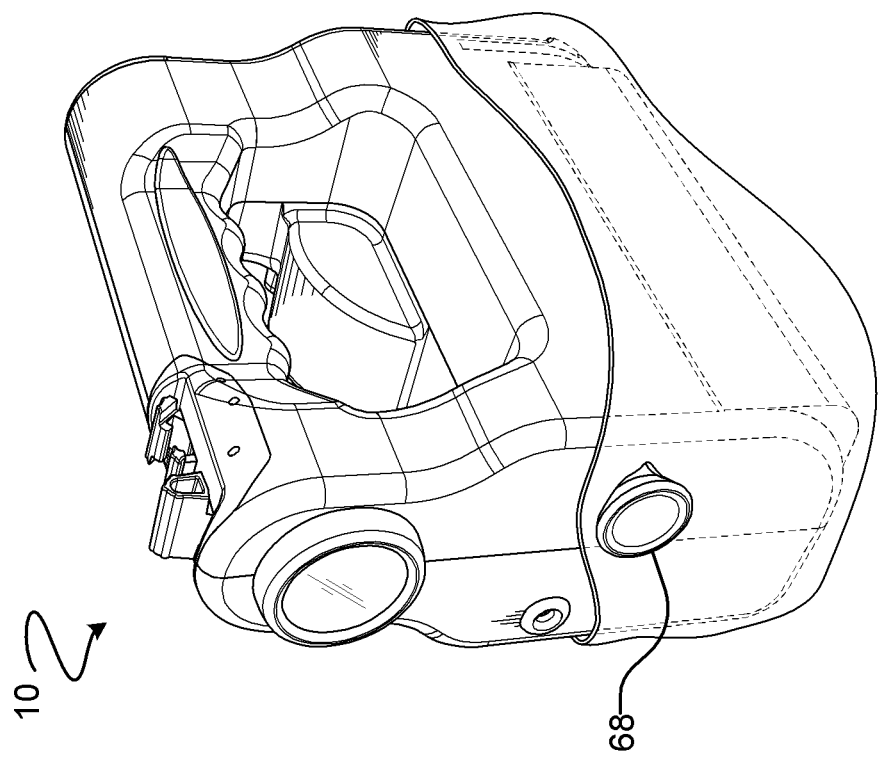
FIG. 9 is a perspective view of the apparatus shown in FIG. 1.

In use, the foregoing features of bag roll 60 permit a user to unspool a bag from bag roll 60 (as shown in FIG. 7), close grapple 30 with the unspooled bag hanging between lip 30D and edge 20F (shown in FIG. 8), then open the bag and draw it inside-out over grapple 30 and the adjacent area of second shell 20B (shown in FIG. 9). Grapple 30 can then be opened and mouth M between lip 30D and edge 20F, spanned by the bag, positioned over pet waste (shown in FIG. 10). The bag thus provides a barrier between apparatus 10 and pet waste. Apparatus 10 can be positioned so that the pet waste is substantially inside mouth M, and grapple 30 closed to capture the pet waste inside the bag and within body compartment 24.

Bags on bag roll 60 may comprise an anchor point near the mouth of the bag configured for coupling to an anchor provided on the exterior of housing 20 and/or grapple 30. In the illustrated embodiment, bags comprise an anchor point, namely perforation 61A, which may be torn to open to define an aperture. The aperture defined by the tearing of perforation 61A may be placed over an anchor, namely knob 68, provided on the exterior of housing 20 (as shown in FIG. 9). Advantageously, the circumferential edge of knob 68 is beveled so that a bag anchored on knob 68 will tend to stay between knob 68 and the adjacent face of housing 20. Anchoring the bag to housing 20 may facilitate one-handed placement of the bag over grapple 30 and the corresponding area of second shell 20B. It will be appreciated that more than one such anchor point could be provided in bags. It will also be appreciated that more than one anchor may be provided on the exterior of housing 20, and that anchor points and anchors may have any suitable configuration.

When apparatus 10 is used to used to capture pet waste inside a bag and within body compartment 24 as describe above, the mouth end of the bag will normally continue to surround grapple 30 and the adjacent portion of second shell 20B immediately after the capture operation. This may be aesthetically displeasing. Furthermore, the mouth of the bag remains open and captured pet waste may fall out of the bag if grapple 30 is inadvertently opened. To address these issues, apparatus 10 comprises means for enabling convenient closure of the open end of a bag used to capture pet waste.

Figure 11:
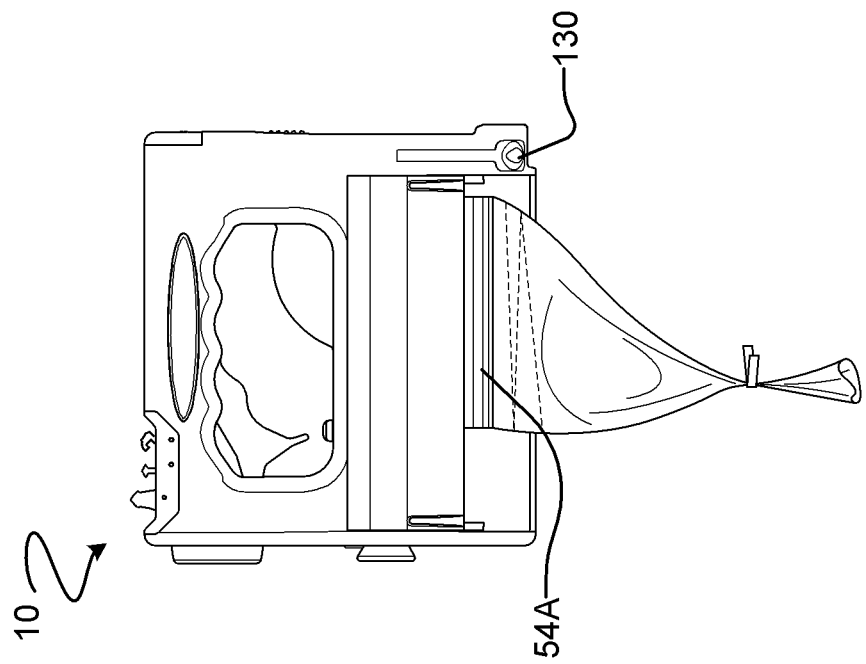
FIG. 11 is a rear elevation view of the apparatus shown in FIG. 1.

Some embodiments comprise adjacent gripping members for holding the closed mouth of a bag extending from bag roll 60. Adjacent gripping members may be located in close proximity or in contact with one another (e.g., one or more of the gripping members is compressible). In the illustrated embodiment, apparatus 10 comprises elastically compressible gripping members, namely compression balls 90 mounted on the rear outer face of housing 20. Compression balls 90 may be comprised of elastically compressible material, such as, for example, elastomer (e.g., rubber), soft plastic, or the like. The exterior surfaces of compression balls 90 may comprise gripping surfaces, such as, for example, anti-slip rubber. Compression balls may be solid or hollow. Compression balls 90 may be used to hold the closed mouth end of an waste containing bag located inside body compartment 24. The holding force of compression balls 90 on the closed mouth of the bag may prevent the bag from opening to release waste contained within it if the grapple 30 is inadvertently opened. Conveniently the space between compression balls 90 straddles the line defined by the interface of lip 30D and edge 20F. As a result, a bag hanging below apparatus 10 may slide between lip 30D and edge 20F toward the space between compression balls 90, as shown in FIG. 11.

It will be appreciated that alternatives to compression balls may be used for holding the closed end of bag extending from bag roll 60. For example, apparatus 10 could comprise opposed compressible members having different shapes and/or configurations, such as, for example, convex leaf springs, spaced-apart plates biased by compression springs, or the like. In some embodiments a compressible gripping member is provided adjacent an incompressible gripping member. In some embodiments, gripping members comprise the fixed facing edges of a notch (e.g., a narrow open-ended slot having rounded or chamfered corners at its mouth). In some such embodiments, the facing edges may be smooth, and holding friction may be developed by pulling the end of the bag into the notch or slot. Gripping members may be provided at any suitable location on apparatus 10.

Some embodiments comprise means for facilitating fastened closure of the mouth of a bag used to capture pet waste. In the illustrated embodiment, apparatus 10 comprises spaced apart magnets 92 on the rear outer face of housing 20. A recessed channel is defined on the rear outer face of housing 20 between spaced apart magnets 92. In the illustrated embodiment, magnets 92 are located on the side of compression balls 90 that is opposite mouth M. In other embodiments, magnets 92 are located on the side of compression balls 90 is proximate mouth M. Spaced apart magnets 90 magnetically attract metallic objects, and may be used to hold metal-containing fasteners, such as, for example, twist-ties, in place. In some embodiments a single magnet is provided to retain a metal containing fastener in place. In some embodiments, magnets are mounted on housing 20 inside body compartment 24, and the magnetic field produced by such magnets penetrates the housing to attract metallic objects.

To make a fastened closure of the open end of a bag used to capture pet waste inside body compartment 24, a user may place a twist tie across spaced-apart magnets 92, close the mouth end of the bag by twisting, bunching or the like, draw the closed mouth of the bag between compression balls 90 and into proximity with the twist-tie held between spaced apart magnets 92, and then tie the twist-tie around the closed mouth of the bag. FIG. 11 illustrates a closed mouth of a bag drawn between compression balls 90 and into proximity with a twist-tie T held between spaced apart magnets 92. Advantageously, the recessed channel between spaced apart magnets 92 permits a user to press the closed mouth of the bag into a twist-tie, so as to deform the twist-tie towards a fastened closure. It will be appreciated that the steps in the foregoing fastened closing operation may be performed in any appropriate order. It will be further appreciated that these steps may be executed using the same hand throughout.

Some embodiments comprise one or more externally accessible storage compartments. Such compartments may be used to store bag closure fasteners, such as twist ties. In the illustrated embodiment, apparatus 10 comprises a storage compartment defined in the rear face of housing 20. A slide door 96 is selectively movable to cover the storage compartment.

Figure 6:
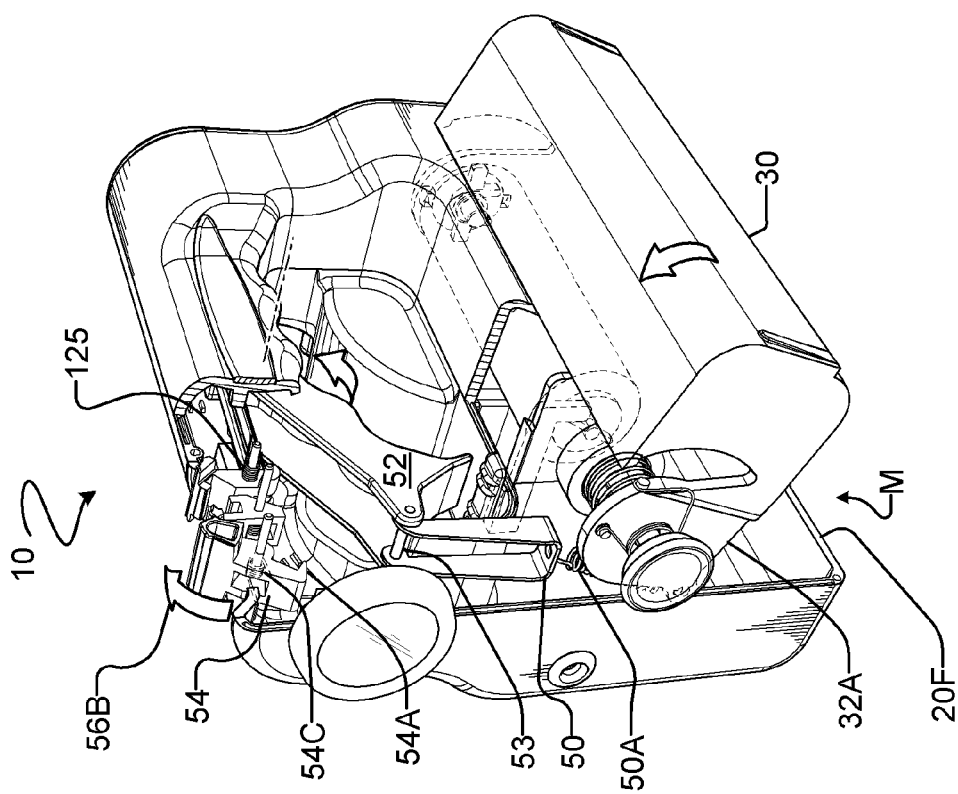
FIG. 6 is a partial cutaway perspective view of the apparatus shown in FIG. 1.
Figure 10:
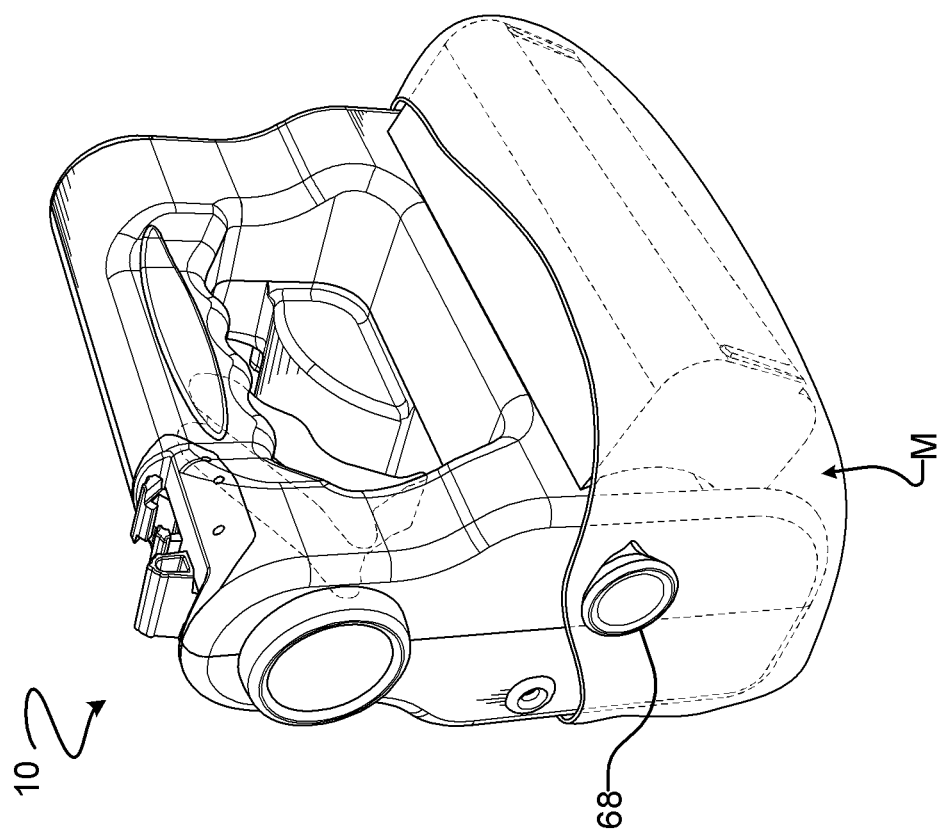
FIG. 10 is a perspective view of the apparatus shown in FIG. 1.

As will be apparent from the foregoing description, apparatus 10 is operable to collect and store animal waste. Steps in an example operation of apparatus 10 to collect and store animal waste include the following:

1. A user gripping handle 26 with an overhand grip releases catch 54 by rotating end 54B with his thumb against the force of torsion spring 56, causing grapple 30 to swing to the open position under force of torsion spring 48 (as shown in FIG. 6). This opens mouth M between lip 30D of grapple 30 and edge 20F of second shell 20B.
2. With his free hand, the user draws a bag from bag roll 60 to a predetermined distance past the bottom of housing 20 (see FIG. 7). Periodic resistance to rotation of bag roll 60 and audible feedback associated therewith may assist the user in ascertaining the pre-determined distance.
3. With the hand gripping handle 26, the user squeezes grip lever 52 to the retracted configuration, causing grapple 30 to swing to the closed position. The bag drawn from bag roll 60 extends between lip 30D of grapple 30 and edge 20F of the second shell 20B (as shown in FIG. 8).
4. With his free hand, the user opens the bag and manually turns it inside-out over both the bottom of housing 20 and grapple 30 (see FIG. 9). To facilitate this operation, the user may anchor perforated aperture 61A near the mouth of the bag on knob 68.
5. With the hand gripping handle 26, the user releases catch 54 by rotating end 54B with his thumb against the force of torsion spring 56, causing grapple 30 to swing to the open position under force of torsion spring 48. This opens mouth M between lip 30D of grapple 30 and edge 20F of second shell 20B. Mouth M is spanned by the bag (as shown in FIG. 10).
6. With the hand gripping handle 26, the user positions apparatus 10 so that the animal waste projects through mouth M inside body compartment 24. The waste is separated from the surfaces of housing 20 and grapple 30 by the bag.
7. With the hand gripping handle 26, the user squeezes grip lever 52 to the retracted position, causing grapple 30 to swing to the closed position and capturing the waste inside body compartment 24, with the bag providing a barrier between the bag and the interior surfaces of housing 20 and grapple 30. With grapple 30 closed, the mouth-end of the bag continues to cover the exterior surfaces of the bottom of housing 20 and grapple 30.
8. With his free hand, the user slides open storage compartment door 96 and removes a twist tie from storage compartment 94. The user then deploys the twist tie across the gap between spaced apart magnets 92. Magnetic attraction holds the twist-tie against magnets 92.
9. With his free hand, the user closes the mouth of the bag. The user may close the mouth end of the bag touching only the surface of the bag that was adjacent housing 20 and grapple 30 during the waste collection step (i.e., the exterior surface of the bag, which has faced away from the waste throughout the collection operation).
10. With his free hand, the user draws the closed mouth of the bag between compression balls 90. Compression balls 90 hold the end of the bag in place adjacent to the twist tie deployed between magnets 92 (as shown in FIG. 11).
11. With his free hand, the user ties the twist tie around the closed mouth of the bag.
12. The user inconspicuously carries the waste containing bag inside apparatus 10 to a disposal site. At the disposal site the user uses the hand gripping handle 26 to releases catch 54 by rotating end 54B with his thumb against the force of torsion spring 56, causing grapple 30 to swing to the open position under force of torsion spring 48. Upon the opening of grapple 30, the waste containing bag hangs under force of gravity from bag roll 60 (as shown in FIG. 12). The twist-tie fastened closure of the mouth of the bag prevents the waste from escaping the bag.
13. Using his free hand, the user slides tear lock 93 to lock rotation of bag roll 60.
14. Using his free hand, the user tears the waste containing bag from the bag roll and deposits it at the disposal site.

Some embodiments of the invention comprise a self-retracting leash for maintaining control of a pet. Self-retracting leashes are known in the art, and in addition to the particular embodiments disclosed herein, any suitable design of self-retracting leash may be used. For example, self-retracting leashes of the sort described in U.S. Pat. No. 2,222,409 to Gottlieb, U.S. Pat. No. 4,269,150 to McCarthy, U.S. Pat. No. 4,501,230 to Talo, U.S. Pat. No. 4,018,189 to Umpheries et al. and U.S. Pat. No. 6,405,683 to Walter et al., all of which are hereby incorporated herein by reference, may be adapted for use in embodiments.

Figure 13:
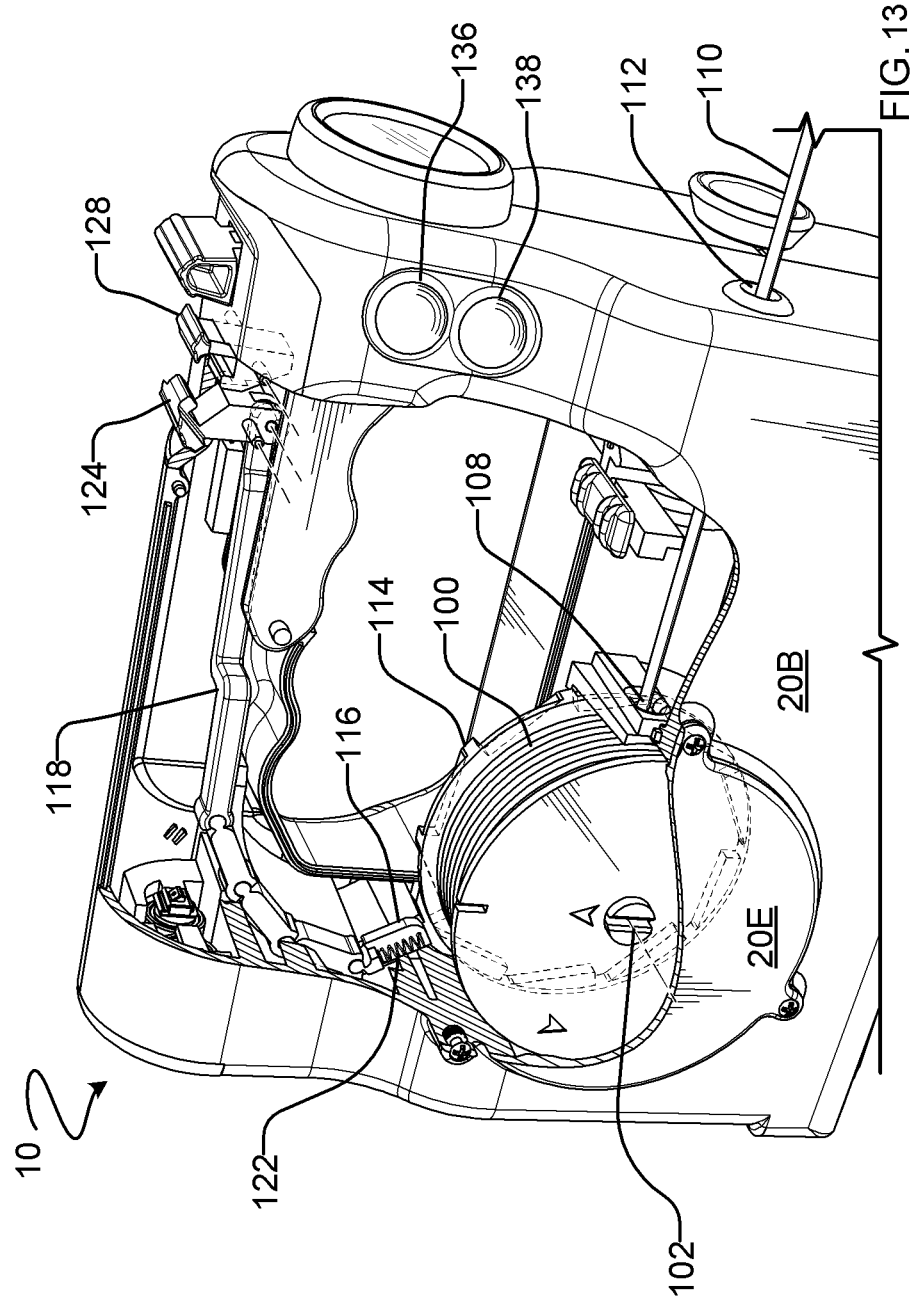
FIG. 13 is a partial cutaway perspective view of the apparatus shown in FIG. 1.
Figure 14:
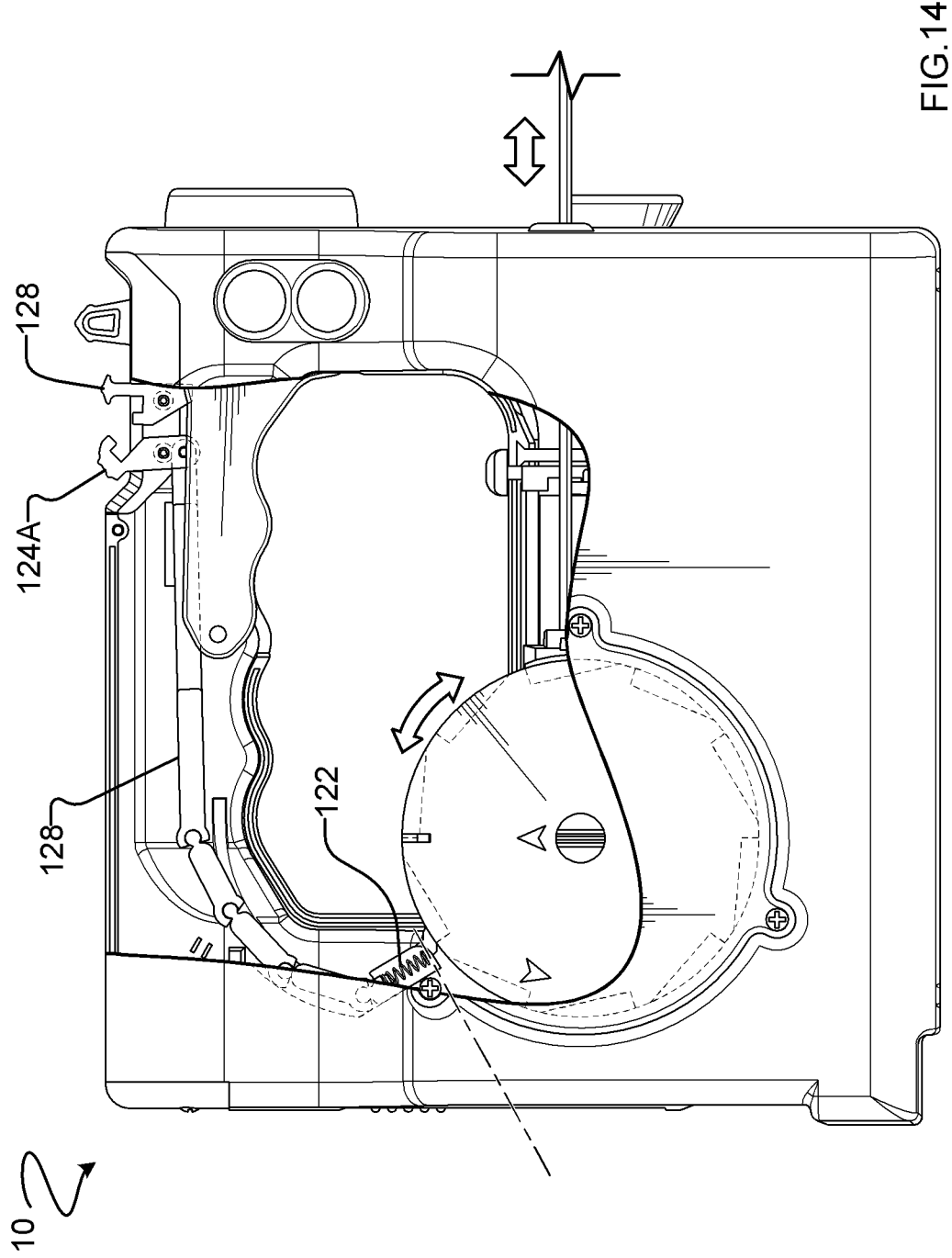
FIG. 14 is a partial cutaway side elevation view of the apparatus shown in FIG. 1.
Figure 15:
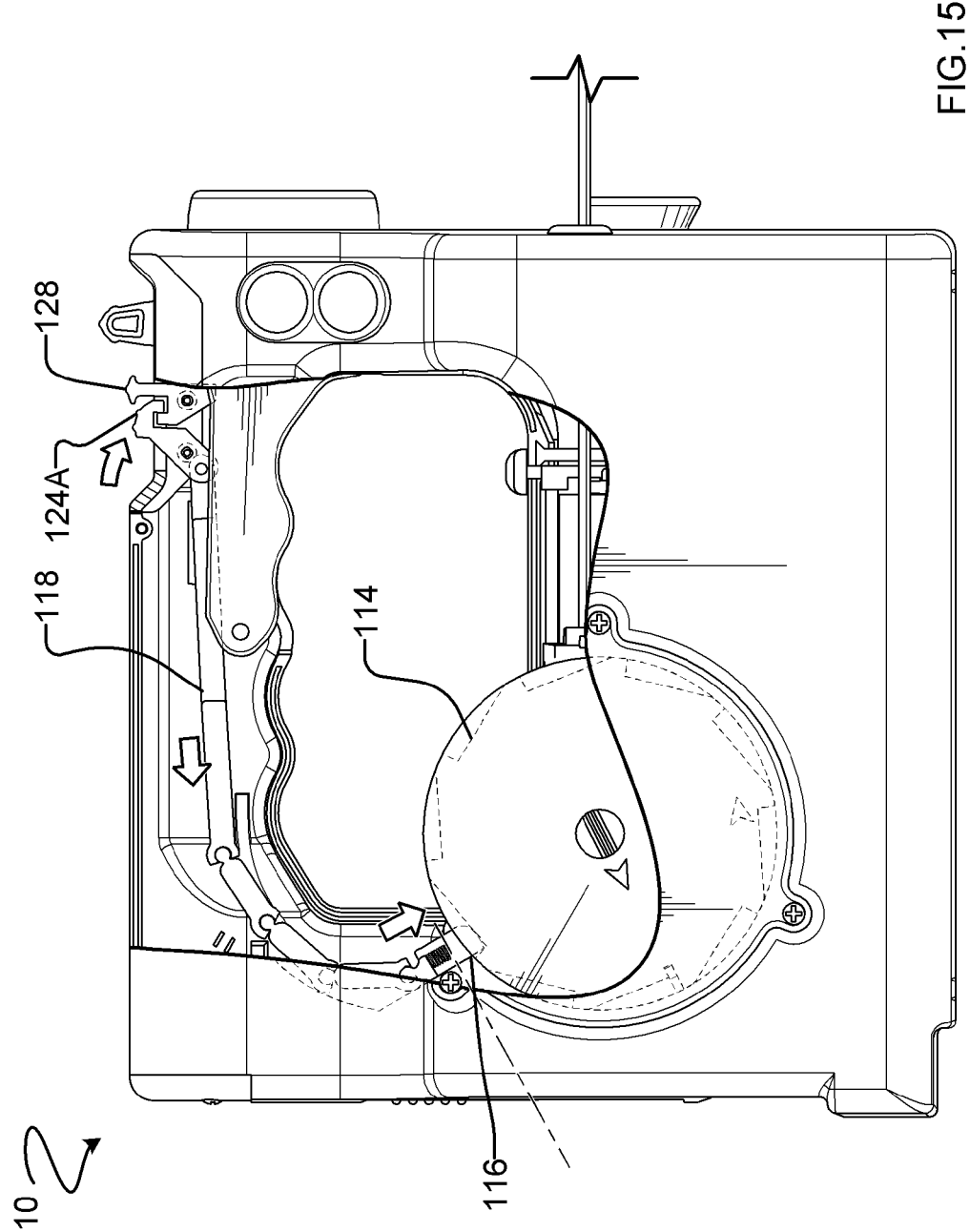
FIG. 15 is a partial cutaway side elevation view of the apparatus shown in FIG. 1.
Figure 16:
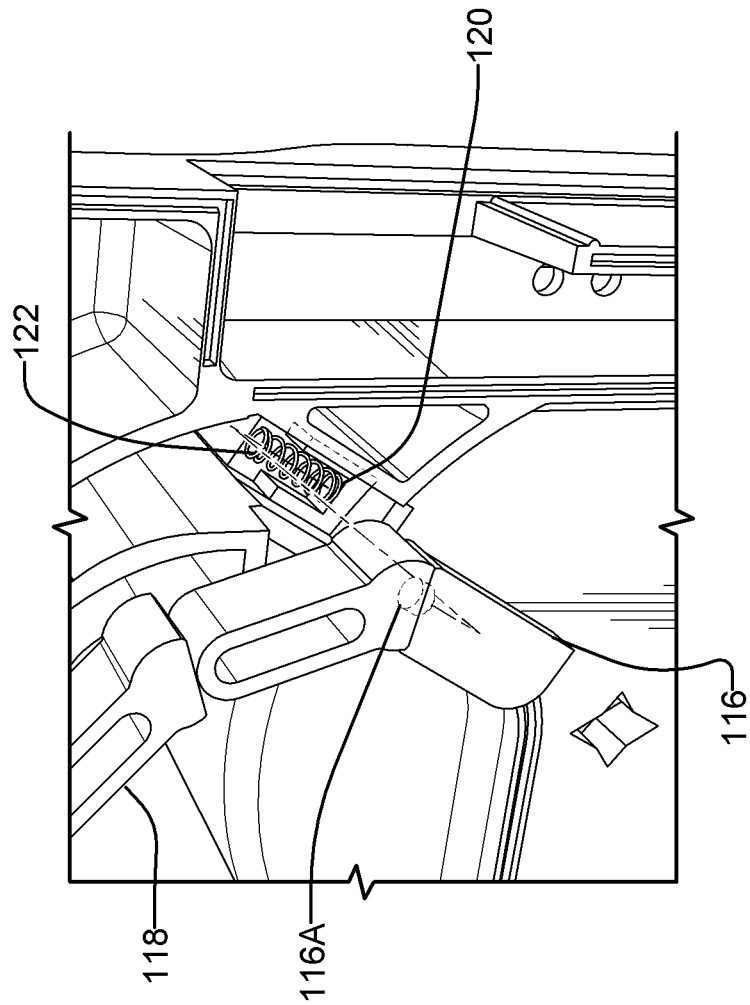
FIG. 16 is a perspective view of a leash reel lock mechanism of the apparatus shown in FIG. 1.

As shown in FIGS. 13-15, second shell 20B of apparatus 10 comprises a drum in which a leash reel 100 is mounted for rotation about a fixed transverse axle 102. A recoil spring (not shown) attached to the transverse axle and wound inside and attached to leash reel 100 biases leash reel 100. A leash 110 attached to and spooled on leash reel 100 may be unspooled through aperture 108 in the drum portion of second shell 20B, through body compartment 24 and grommet 112 against the rotational bias force exerted by the recoil spring. Retraction of leash 110 inside housing 10 is prevented by a stopper (not shown), which cannot pass through grommet 112.

A removable leash drum panel 20D covers drum 20G. In the illustrated embodiment, screws secure panel 20D over drum 20G. In some embodiments, leash reel 100 is removably mounted on transverse axle 102, so as to be replaceable in the event that leash 110 breaks.

In some embodiments, the leash reel is selectively lockable. In the illustrated embodiment, a ratchet gear 114 is formed on a wall of reel 100. A pawl 116 is connect to an end of a linkage 118. Linkage 118 comprises a plurality of interconnected links. Pawl 116 and linkage 118 are located in a channel formed in second shell 20B. Pawl 116 and linkage 118 are movable in the channel such that pawl 116 is engageable with ratchet gear 114 to inhibit rotation of leash reel 100. A compression spring 122 is fitted between a tab 116A formed on pawl 116 and a bearing surface 120 formed at the end of the channel. Compression spring 122 biases pawl 116 away from engagement with ratchet gear 114.

Linkage 118 is connected to a leash stop switch 124. Leash stop switch 124 is transversely pivotally mounted in actuator panel 20C. A torsion spring 125 (visible in FIGS. 6 and 7) biases leash stop switch 124 to draw linkage 118, and by extension pawl 116, away from engagement with ratchet gear 114 (as shown in FIG. 14). Leash stop switch 124 may be pivoted to move linkage 118, and by extension pawl 116, along the channel toward ratchet gear 114, by exerting force on free end 124A of switch 124 against the biasing force of the torsion spring 125 (as shown in FIG. 15). When leash stop switch 124 is pivoted to move linkage 118 along the channel, pawl 116 engages ratchet gear 114 to inhibit rotation of leash reel 100.

Leash stop switch 124 may be maintained in the pivoted leash-locking position by locking engagement with a leash lock switch 128 located in actuator panel 20C. The engagement of leash stop switch 124 with leash lock switch 128 may be broken by rotating leash lock switch 128 away from the front face of housing 20 against the force of another torsion spring (not shown). It will be appreciated that the operation required for unlocking leash stop switch 124 requires movement of leash locking switch 128 in a direction substantially opposite the direction in which a leash would normally extend through grommet 112.

It will be appreciated that co-location of the controls for grapple 30 and leash reel 100 at the same end of handle 26 may permit a user to operate the pet waste collection and leash functions of apparatus 10 with a single hand and without changing her grip of handle 26.

In some embodiments, apparatus 10 comprises one or more lights. In the illustrated embodiment, apparatus 10 comprises a ground illuminating light 130 located at the rear end of housing 20. In the illustrated embodiment, ground illuminating light comprises an LED, but any suitable lighting technology may be used. Ground illuminating light 130 is operable to emit light in a direction substantially normal to the bottom of housing 20. Advantageously, ground illuminating light 130 may be operated to provide illumination to a ground surface while apparatus 10 is positioned to locate mouth M over pet waste deposited on the ground surface.

The illustrated embodiment also comprises a flashlight 132 located on the front face of housing 20. Flashlight 132 is operable to emit light in a direction substantially parallel to the axis of handle 126. Flashlight 126 may comprise any suitable lighting technology, such as, for example, LED, incandescent, or the like. Replaceable batteries 134 located at the rear of housing 20 provide power for ground illuminating light 130 and flashlight 132. Replaceable batteries may be accessed by removing battery compartment panel 20D.

Ground illuminating light 130 and flashlight 132 are operable using push buttons 136 and 138, respectively, which are located on second shell 20B adjacent to the end of handle 26 at which actuator panel 20C is located. It will be appreciated that a user holding handle 26 with an overhand grip may be able to operate push buttons 136 and 138 using the digits of the hand holding handle 26 without adjusting the grip on handle 26.

Where a component (e.g. a torsion spring, extension spring, lever, switch, axle, pin, linkage, grapple, handle, control, mount, knob, pawl, ratchet, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Where a verb (e.g., journal) or functional adjective (e.g., slidable) is used above, unless otherwise indicated, reference to that verb or functional adjective should be interpreted as including as equivalents of that verb or functional adjective any verb or functional adjective according to which components, including functionally equivalent components of components referred to above, perform or are configured to perform a described function.

Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations, modifications, additions and permutations are possible in the practice of this invention without departing from the spirit or scope thereof. The embodiments described herein are only examples. Other example embodiments may be obtained, without limitation, by combining features of the disclosed embodiments. It is therefore intended that the following appended claims and claims hereafter introduced are interpreted to include all such alterations, modifications, permutations, additions, combinations and sub-combinations as are within their true spirit and scope.

What is claimed is:

1. A pet waste collection apparatus comprising:
   a housing defining in part a body compartment for receiving pet waste;
   a handle coupled to the housing;
   a grapple coupled to the housing and selectively operable between a closed position in which the grapple and housing substantially enclose the body compartment and an open position in which the grapple and housing define a mouth in communication with the body compartment;
   a grapple control on the handle for selectively operating the grapple between the open and closed positions; and
   an axle mount configured to support a bag roll inside the body compartment.

2. The apparatus of claim 1 wherein the grapple control comprises a grip lever selectively pivotable from an extended configuration to a retracted configuration by squeezing the grip lever toward the handle.

3. The apparatus of claim 2 comprising a grapple torsion spring configured to rotationally bias the grapple, wherein the grapple control comprises a catch configured to selectively latch the grapple against the bias of the grapple torsion spring.

4. The apparatus of claim 3 wherein the grapple torsion spring is configured to bias the grapple to an open position and wherein the grip lever is configured such that pivotal movement thereof from the extended configuration to the retracted configuration operates the grapple from the open position to the closed position.

5. The apparatus of claim 1 wherein the axle mount comprises a first axle engaging member for receiving a first end of the bag roll and a second axle engaging member for receiving a second end of the bag roll, the first axle engaging member resiliently biased toward the second axle engaging member.

6. The apparatus of claim 5 comprising a knob coupled to the first axle engaging member, the knob selectively operable to move the first axle engaging member away from the second axle engaging member.

7. The apparatus of claim 5 comprising an axle mounted in the axle mount, the axle having an axle mount engaging member, wherein the first axle engaging member is configured to mate with the axle mount engaging member.

8. The apparatus of claim 7 wherein the first axle engaging member comprises a ratchet wheel having at least one radially inwardly projecting tooth and the axle mount engaging member comprises a pawl member having at least one pawl configured to engage the at least one radially inwardly projecting tooth for ratchet action.

9. The apparatus of claim 7 comprising a rotating member rigidly connected to the axle, the rotating member configured to periodically develop friction against an inhibiting member in fixed relation with the housing when the axle rotates.

10. The apparatus of claim 9 wherein the inhibiting member comprises a ratchet wheel having at least one radially inwardly projecting tooth and the rotating member comprises a pawl member having at least one pawl configured to engage the at least one radially inwardly projecting tooth for ratchet action.

11. The apparatus of claim 9 comprising a knob coupled to the first axle engaging member, wherein the inhibiting member comprises a groove formed in the exterior face and the rotating member comprises a radially extending tab formed on a face of the knob adjacent an exterior face the housing, the tab configured to frictionally engage the groove when the knob rotates.

12. The apparatus of claim 1 comprising a tear lock mounted in a wall of the housing, the tear lock selectively operable to lock rotation of a bag roll inside the housing.

13. The apparatus of claim 1 comprising a bag roll supported by the axle mount, the bag roll comprising a spooled web of interconnected plastic bags.

14. The apparatus of claim 13 wherein the web is folded along its length in a zig-zag fashion.

15. The apparatus of claim 13 wherein the web is subdivided by perforations at an angle to the lateral edges of the web.

16. The apparatus of claim 1 comprising adjacent gripping members on an exterior surface of the housing for holding between each other a mouth end of a bag extending from the body compartment.

17. The apparatus of claim 16 wherein at least one of the gripping members comprises an elastically compressible member.

18. The apparatus of claim 16 wherein the gripping members comprise a pair of compression balls.

19. The apparatus of claim 16 wherein the gripping members comprise the facing edges of a notch.

20. The apparatus of claim 1 comprising a magnet mounted on the housing and configured to hold a metal containing fastener.

21. The apparatus of claim 1 comprising a self-retracting leash reel mounted inside the housing, the leash reel having a leash extending through a leash aperture defined in the housing.

22. The apparatus of claim 21 wherein the leash reel is removable from the housing.

23. The apparatus of claim 21 comprising a leash stop switch on the handle, the leash stop switch connected to selectively inhibit rotation of the leash reel, the leash stop switch operable between an inhibiting position in which rotation of the leash reel is inhibited and a release position in which rotation of the leash reel is not inhibited.

24. The apparatus of claim 23 comprising a leash lock switch on the handle, the leash lock switch operable to lock the leash stop switch in the inhibiting position, the leash lock switch is configured to release the leash stop switch from the inhibiting position when the leash lock switch is moved in a direction opposite the direction in which the leash extends from the leash reel through the leash aperture.

25. The apparatus of claim 23 wherein the leash stop switch and the grapple control are located at a first end of the handle.

26. The apparatus of claim 1 wherein the handle and the mouth are on substantially opposite sides of the body compartment.

27. A bag roll mountable in a pet waste collection apparatus according to claim 1, the bag roll comprising:
   an elongate member having first and second ends;
   a first axle mount engaging member coupled to the first end of the elongate member;
   a second axle mount engaging member coupled to the second end of the elongate member;
   a web of interconnected bags spooled around the elongate member.

28. A bag roll according to claim 27 wherein the first axle mount engaging member comprises a pawl member.

29. A bag roll according to claim 28 wherein the pawl member comprises a central portion and at least one resilient pawl extending generally radially from and circumferentially around the central portion.

30. A bag roll according to claim 29 wherein the at least one pawl comprises a flange at its outward end.

31. A bag roll according to claim 28 wherein the pawl member comprises a central portion and three resilient pawls extending generally radially from and circumferentially around the central portion.

32. A bag roll replacement kit comprising:
   an elongate member having first and second ends;
   a web of interconnected bags spooled around the elongate member;
   at least one axle mount engaging member having a first end configured for coupling with at least one of the first and second ends of the elongate member and having a second end configured for engaging at least one of the first and second axle engaging members of a pet waste collection apparatus comprising:
   a housing defining in part a body compartment for receiving pet waste;
   a handle coupled to the housing;
   a grapple coupled to the housing and selectively operable between a closed position in which the grapple and housing substantially enclose the body compartment and an open position in which the grapple and housing define a mouth in communication with the body compartment;
   a grapple control on the handle for selectively operating the grapple between the open and closed positions; and
   an axle mount configured to support a bag roll inside the body compartment, the axle mount comprising:
      a first axle engaging member for receiving a first end of the bag roll and a second axle engaging member for receiving a second end of the bag roll, the first axle engaging member resiliently biased toward the second axle engaging member.

33. A pet waste collection kit comprising:
   a pet waste collection apparatus comprising:
      a housing defining in part a body compartment for receiving pet waste;
      a handle coupled to the housing;
      a grapple coupled to the housing and selectively operable between a closed position in which the grapple and housing substantially enclose the body compartment and an open position in which the grapple and housing define a mouth in communication with the body compartment;
      a grapple control on the handle for selectively operating the grapple between the open and closed positions; and an axle mount configured to support a bag roll inside the body compartment, the axle mount comprising:
   a first axle engaging member for receiving a first end of the bag roll and a second axle engaging member for receiving a second end of the bag roll, the first axle engaging member resiliently biased toward the second axle engaging member; and at least one bag roll according to claim 27.

34. A pet waste collection apparatus comprising:

a housing defining in part a body compartment, the housing comprising first and second end faces on opposite sides of the body compartment;

a handle formed integrally with the housing between the first and second end faces;

a grapple coupled at a first end to the housing by a retention pin received in a first aperture at the first end face of the housing and at a second end by a collar mounted at the second end face of the housing, the retention pin and collar mutually co-axial, the grapple rotatable between a closed position in which the grapple and housing substantially enclose the body compartment and an open position in which the grapple and housing define a mouth in communication with the body compartment, the grapple biased for rotation to the open position;

a grip lever mounted at the first end of the handle selectively operable between an extended configuration and a retracted configuration;

a catch mounted at the first end of the handle selectively operable to latch the grip lever in the retracted configuration;

a grip lever linkage connecting the grip lever to the grapple, the grip lever linkage communicating force between the grip lever and the grapple, such that movement of the grip lever to the retracted configuration corresponds to rotation of the grapple to the closed position and rotation of the grapple to the open position corresponds to movement of the grip lever to the extended configuration;

a torsion spring connected between the grapple and the housing to bias the grapple for rotation to the open position;

a knob rigidly connected to a first end of the retention pin;

an axle engaging member rigidly connected to a second end of the retention pin;

a support plate extending transversely from the housing into the body compartment;

a compression spring connected between the axle engaging member and the transverse support plate to normally bias the axle engaging member toward the collar a pair of adjacent gripping members located on the second end face of the housing; and a pair of spaced apart magnets mounted on an exterior surface of the housing for magnetically retaining a metal containing fastener.

\* \* \* \* \*